US010703151B2

(12) United States Patent
Newman

(10) Patent No.: US 10,703,151 B2
(45) Date of Patent: Jul. 7, 2020

(54) TUGGER CAGE CART LOCKING DEVICE

(71) Applicant: Target Brands, Inc., Minneapolis, MN (US)

(72) Inventor: Justin Newman, Minneapolis, MN (US)

(73) Assignee: TARGET BRANDS, INC., Minneapolis, MN (US)

(*) Notice: Subject to any disclaimer, the term of this patent is extended or adjusted under 35 U.S.C. 154(b) by 175 days.

(21) Appl. No.: 15/850,964

(22) Filed: Dec. 21, 2017

(65) Prior Publication Data
US 2019/0193494 A1 Jun. 27, 2019

(51) Int. Cl.
B60D 1/02 (2006.01)
B60D 1/28 (2006.01)
B60D 1/36 (2006.01)
B62B 5/00 (2006.01)
B62B 3/00 (2006.01)
B60D 1/06 (2006.01)
B60D 1/58 (2006.01)
B60D 1/04 (2006.01)
B60D 1/00 (2006.01)

(52) U.S. Cl.
CPC ............ B60D 1/363 (2013.01); B60D 1/04 (2013.01); B60D 1/065 (2013.01); B60D 1/583 (2013.01); B62B 3/002 (2013.01); *B60D 2001/005* (2013.01); *B62B 5/0079* (2013.01)

(58) Field of Classification Search
CPC ..... B62B 3/002; B62B 5/0072; B62B 5/0079; B60D 2001/005; B60D 2001/544; B60D 1/54; B60D 1/363; B60D 1/02; B60D 1/04; B60D 1/28

USPC ..................................................... 280/491.3
See application file for complete search history.

(56) References Cited

U.S. PATENT DOCUMENTS

| 1,423,084 | A | * | 7/1922 | Cotton | B60D 1/54 280/478.1 |
| 1,848,956 | A | * | 3/1932 | Koehler | B60D 1/04 280/491.3 |
| 2,185,447 | A | | 1/1940 | Smith | |
| 2,459,245 | A | | 1/1949 | Seward | |
| 2,478,736 | A | | 8/1949 | Balzer | |
| 2,593,247 | A | * | 4/1952 | Benteman | B60D 1/025 280/515 |
| 2,813,727 | A | * | 11/1957 | Whalen | B60D 1/481 280/408 |

(Continued)

OTHER PUBLICATIONS ittp://www.cisco-eagle.com/catalog/category/8659/tuggers, Cisco-Eagle, Industrial Tuggers, Moving materials faster with less manpower (2018).

(Continued)

*Primary Examiner* — Anne Marie M Boehler
(74) *Attorney, Agent, or Firm* — Merchant & Gould P.C.

(57) ABSTRACT

A system and method for securing the connection between carts that are configured to connect to each other to form a train of carts, as well as for securing the connection between a cart and a tugger that tows the carts. The system and method involves providing a spring biased blocking plate that is positioned above the boss of the drawbar when the drawbar is engaged with a hitch plate. The blocking plate limits vertical movement of the drawbar thereby preventing inadvertent disconnection of the drawbar from the hitch plate.

13 Claims, 7 Drawing Sheets

(56) References Cited

U.S. PATENT DOCUMENTS

| | | | |
|---|---|---|---|
| 3,190,677 A | 6/1965 | Robbins | |
| 3,998,472 A | 12/1976 | Tretter | |
| 4,002,352 A | 1/1977 | Hager | |
| 4,579,364 A * | 4/1986 | Kranz | B60D 1/28 280/507 |
| 6,145,866 A | 11/2000 | Peter | |
| 7,004,489 B2 * | 2/2006 | Brown | B60D 1/00 280/491.3 |
| 7,044,495 B2 | 5/2006 | Van Den Bosch et al. | |
| 7,429,057 B2 | 9/2008 | Johns et al. | |
| 7,431,320 B2 * | 10/2008 | Madden, III | B60D 1/28 280/432 |
| 8,720,933 B2 | 5/2014 | Raider et al. | |
| 9,333,821 B1 | 5/2016 | Rosario | |
| 2008/0023940 A1 * | 1/2008 | Warford | B60D 1/065 280/507 |
| 2014/0008892 A1 * | 1/2014 | Holtan | B60D 1/02 280/411.1 |

OTHER PUBLICATIONS http://www.vestilmfg.com/products/mhequip/carts-ergo_handle_cart.htm, Vestil, Material Handling Carts, (2018).

* cited by examiner

TUGGER CAGE CART LOCKING DEVICE

BACKGROUND

Wheeled carts that connect to each other to form a train of carts towed by a tugger are commonly used to transport materials in a warehouse. Each cart has a chassis supported on wheels, a hitch at the rear end of the chassis, and a drawbar at the front end of the chassis. The distal end of the drawbar of each chassis is configured to be coupled to the hitch of an adjacent cart as well as the hitch of a tugger.

An existing configuration for the drawbar and hitch coupling involves a hitch that includes a rearward extending plate with a vertically oriented aperture ("hitch hole"). The drawbar terminates with a downwardly extending boss ("the boss") configured to be received in the aperture of a hitch hole. Typically, the drawbar is configured to pivot at least about a horizontal axis, which allows the boss of one cart to be conveniently connected to the hitch hole of another cart by simply pivoting counter clockwise (upward) the drawbar, aligning the boss with the hitch hole, and dropping the drawbar thereby engaging the boss of the drawbar with the hitch hole. The hitch hole of the cart and tugger may or may not be at the same height from the ground. The connection between the boss and the hitch hole allows the boss to pivot relative to the hitch hole about a vertical axis thereby allowing the carts to track in when pulled.

The existing configuration is desirable at least in part because it is simple. There are very few moving parts to maintain and the connection is fast and efficient. However, a disadvantage of the current system is that the carts can inadvertently disconnect from another cart or the tugger if the drawbar pivots counterclockwise, which can happen if the carts travel over a bump or if they are stopped abruptly. The present disclosure provides a system and method that preserves the advantages of the existing system while also addressing the drawbacks of the existing system.

SUMMARY

The present disclosure provides a system and method for securing the connection between carts that are configured to connect to each other to form a train of carts, as well as for securing the connection between a cart and a tugger that is configured to tow the carts. The system and method involves providing a spring biased blocking plate above the boss of the drawbar when the drawbar is engaged with a hitch plate. The blocking plate limits vertical movement of the drawbar thereby preventing inadvertent disconnection of the drawbar from the hitch plate. Various aspects are described in this disclosure, which include, but are not limited to, the following aspects.

DETAILED DESCRIPTION

Figure 1:
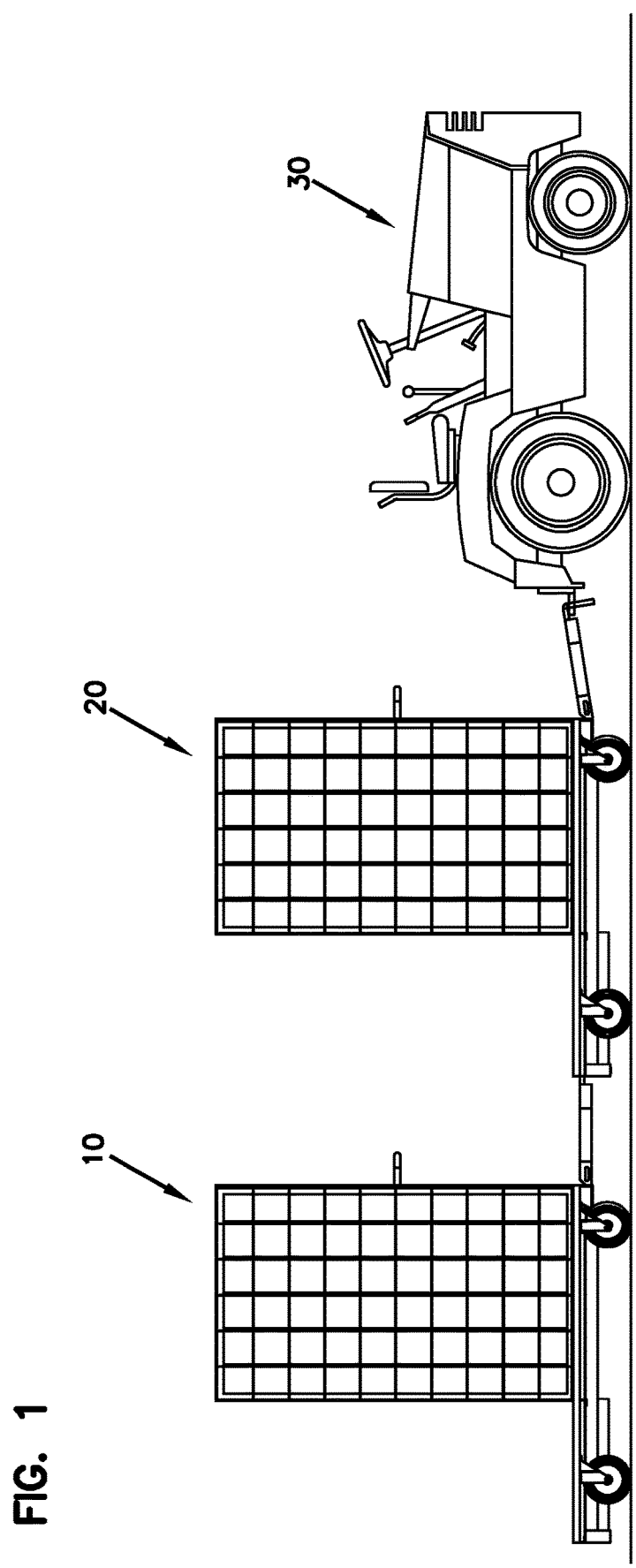
FIG. 1 is a side view of carts according to the present disclosure arranged in a train being pulled by a tugger.
Figure 2:
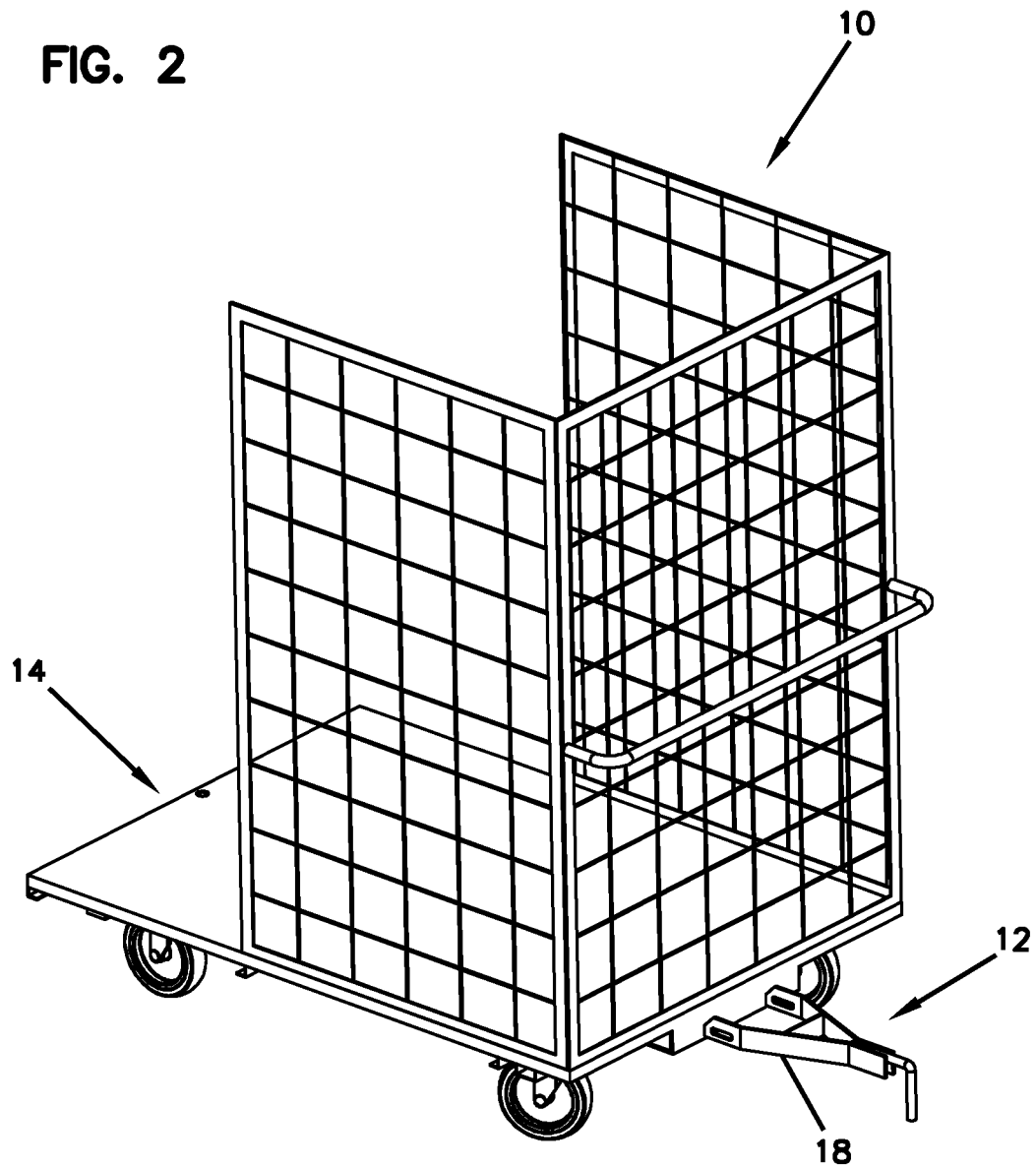
FIG. 2 is a front perspective view of an embodiment of a cart according to the present disclosure.
Figure 3:
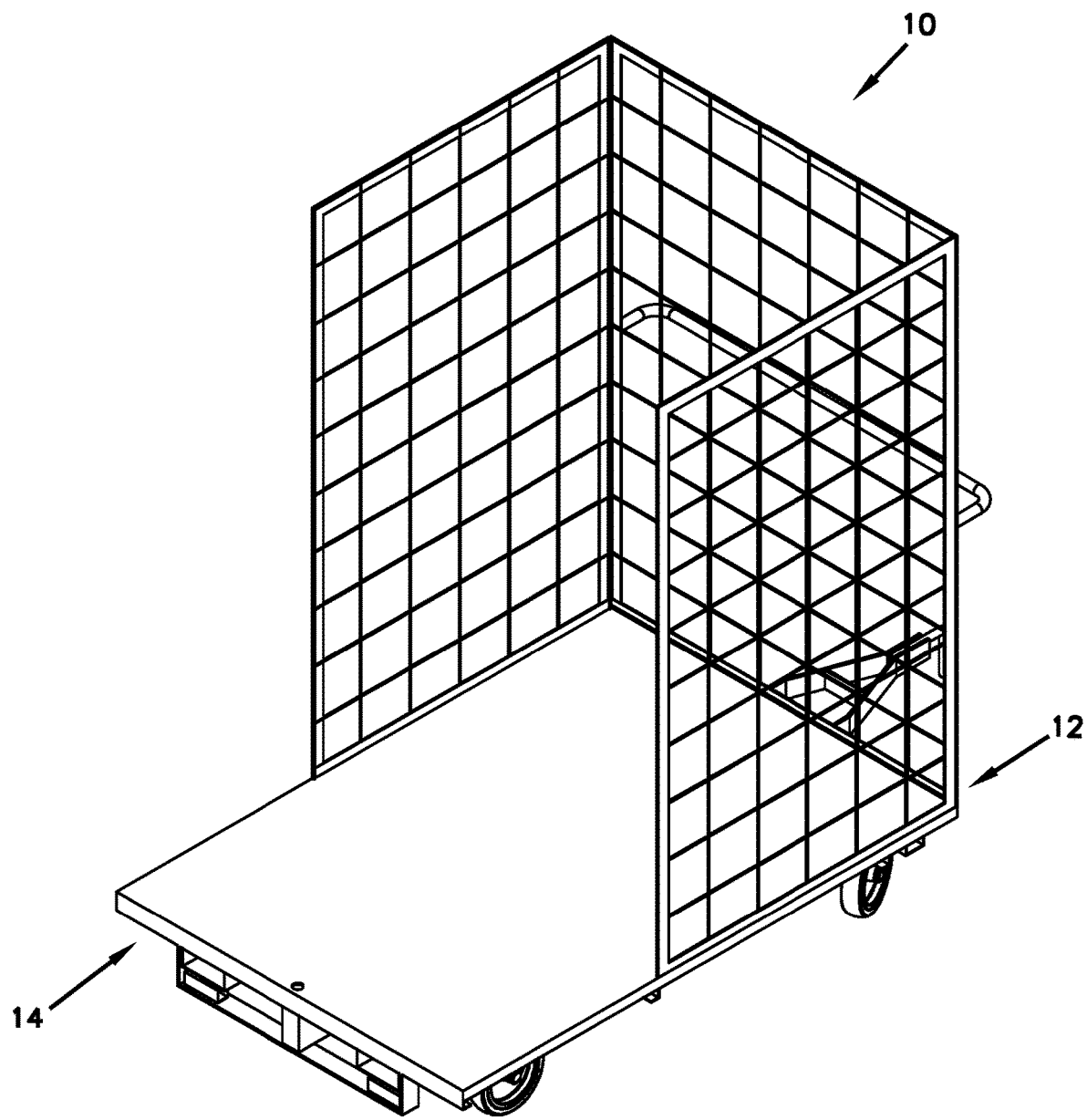
FIG. 3 is a rear perspective view of the cart of FIG. 1.
Figure 4:
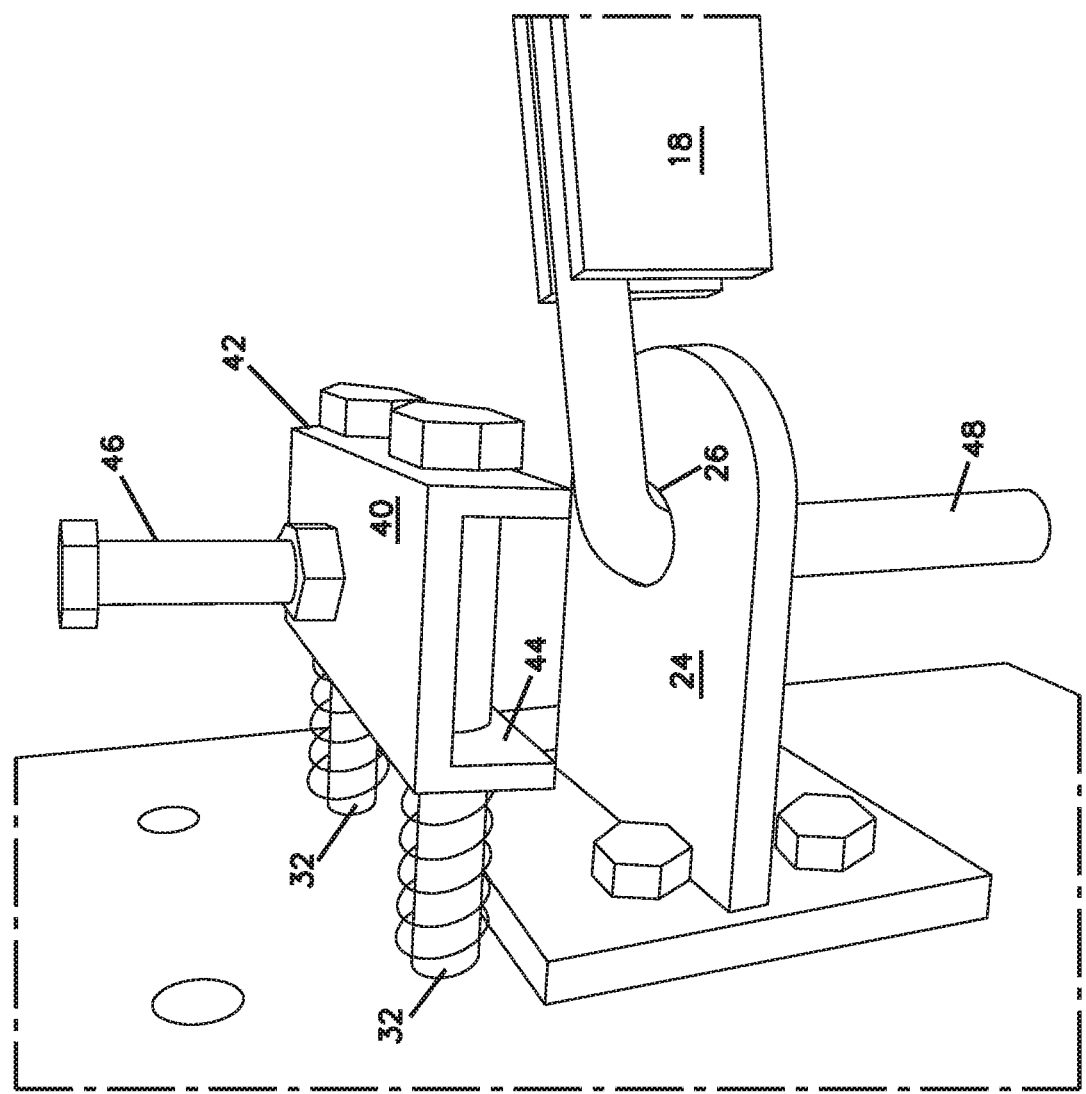
FIG. 4 is a perspective view of a hitch assembly according to the present disclosure.
Figure 5:
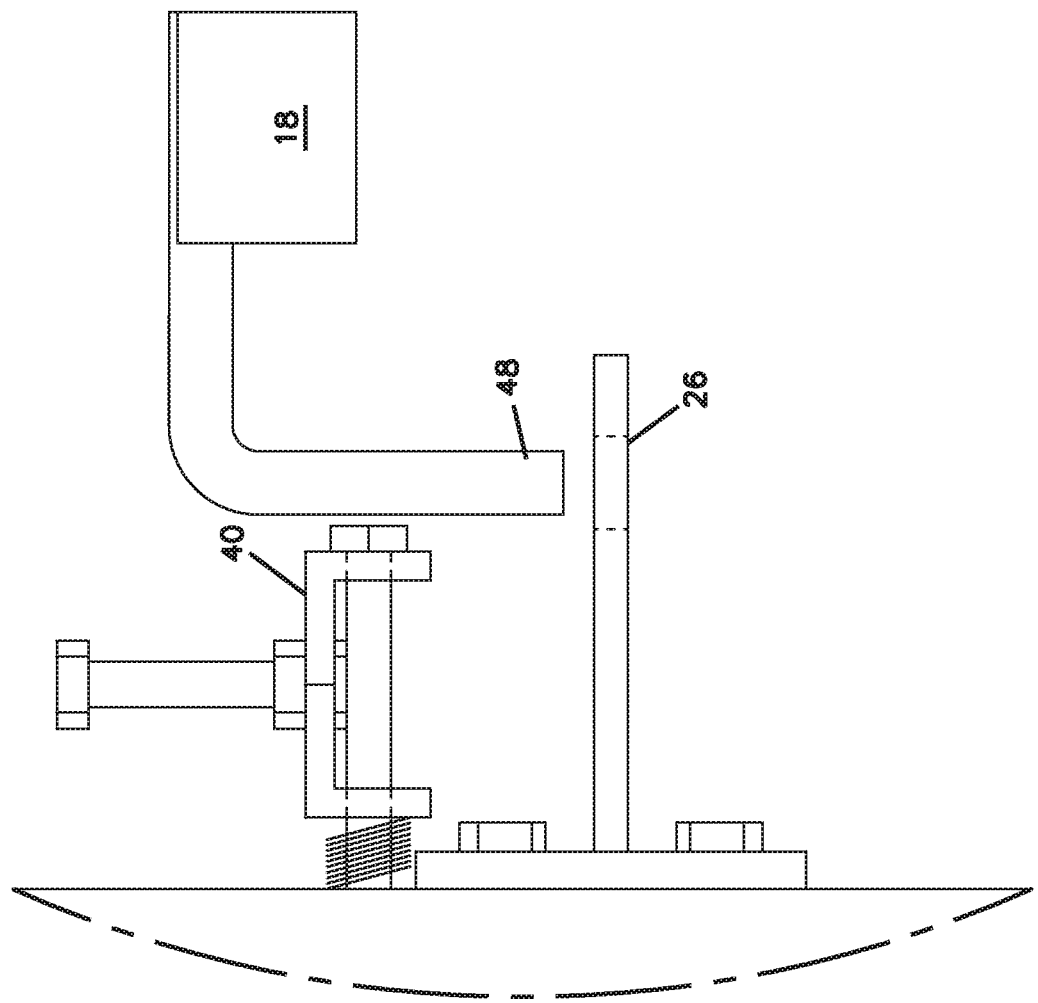
FIG. 5 is a side view of the drawbar of a cart in the process of being connected to the hitch hole of a tugger.

An embodiment of the present disclosure is described herein in further detail with reference to the figures. Referring to FIG. 1, an embodiment of the system includes multiple carts 10, 20 that are coupled to each other to form a train of carts. The train of carts is shown being towed by a tugger 30. An embodiment of a cart according to the present disclosure is described in more detail with reference to FIGS. 2-3. It should be appreciated that many other alternative cart and tugger configurations are also possible.

In the depicted embodiment, the cart 10 includes a chassis supported on a plurality of wheels 16. The chassis has a front end 12 and a rear end 14. In the depicted embodiment, the cart 10 includes a drawbar 18 pivotally connected to the front end 12 of the chassis and a hitch assembly 22 at the rear end 14 of the chassis. In the depicted embodiment, the drawbar 18 is pivotally connected to a drawbar mount (e.g., flanges) that extend from the front end 12 of the chassis. In the depicted embodiment, a pivot pin extends through the drawbar mount and the drawbar. The pivot pin defines a horizontal pivot axis of which the drawbar pivots. As discussed above, many alternative cart configurations are possible.

An embodiment of a hitch assembly 22 according to the present disclosure includes a hitch plate 24 extended in a rearward direction. In the depicted embodiment, the hitch plate 24 includes a vertical aperture 26. The hitch assembly 22 additionally includes a drawbar locking assembly 28 positioned above the hitch plate 24. In the depicted embodiment, the hitch assembly 22 includes a blocking plate 40 that is configured to slide rearwardly and forwardly on along the plate guide assembly. Many alternative configurations are possible. For example, the blocking plate 40 could be a single horizontal bar or any other structure that could limit the vertical movement of the drawbar, thereby preventing the boss from inadvertently decoupling from the hitch hole.

In the depicted embodiment, the guide assembly is positioned above the hitch plate 24. In the depicted embodiment, the plate guide assembly includes two parallel bars 32, 34 that extend rearwardly. Each of the bars 32, 34 include a coil spring 36, 38 coaxially positioned around each bar 32, 34. In the depicted embodiment, the blocking plate 40 includes lower extending flanges 42, 44 of which the bars 32, 34 extend through. The springs 36, 38 bias the blocking plate 40 rearwardly. In the depicted embodiment, the hitch assembly 22 includes a kick bar 46 that extends upwardly from the blocking plate 40. It should be appreciated that many alternative configurations are possible. For example, in an alternative embodiment, there may be only one coil spring in the system, or zero coil springs in the system. Other biasing means could be used to bias the plate to a position above the hitch hole, including gravity. Also, in an alternative embodiment, there may be no kick bar.

Figure 6:
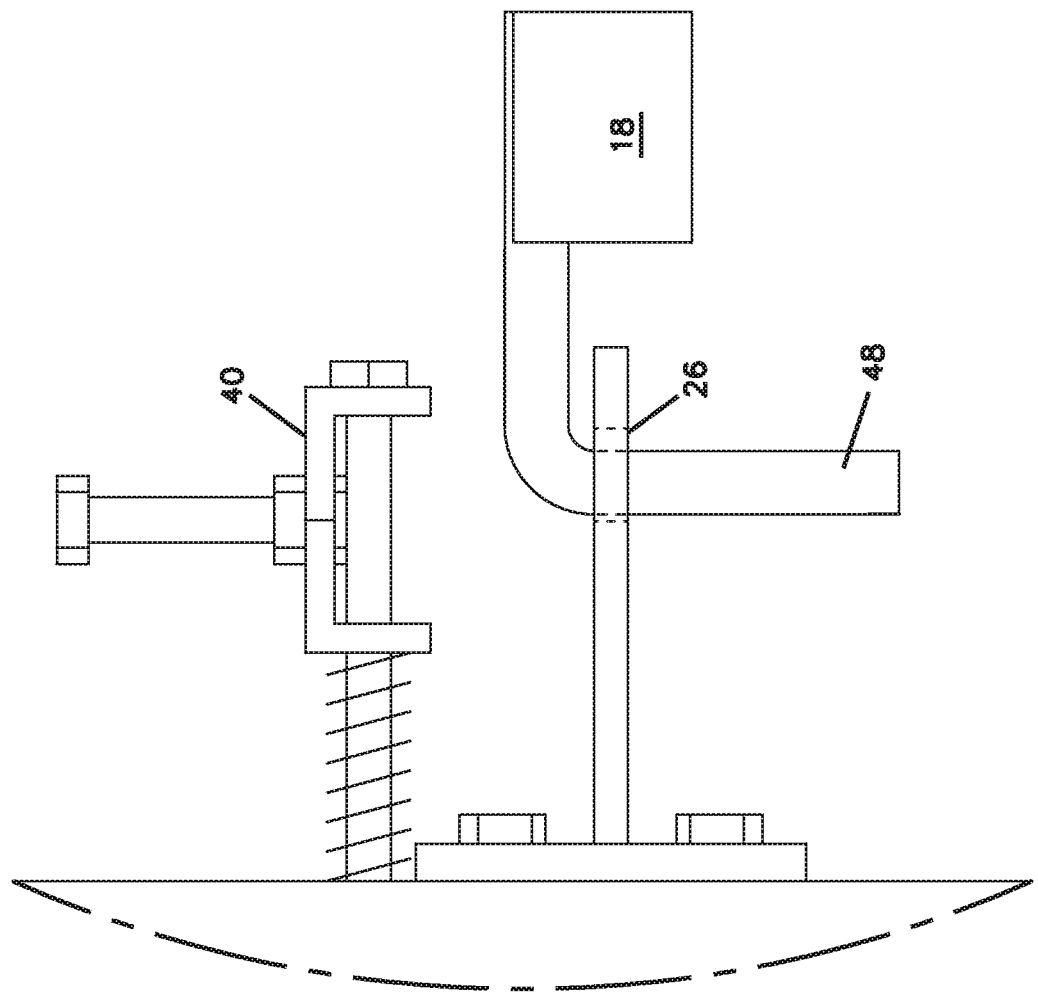
FIG. 6 is a side view of the drawbar of a cart connected to the hitch hole of a tugger.
Figure 7:
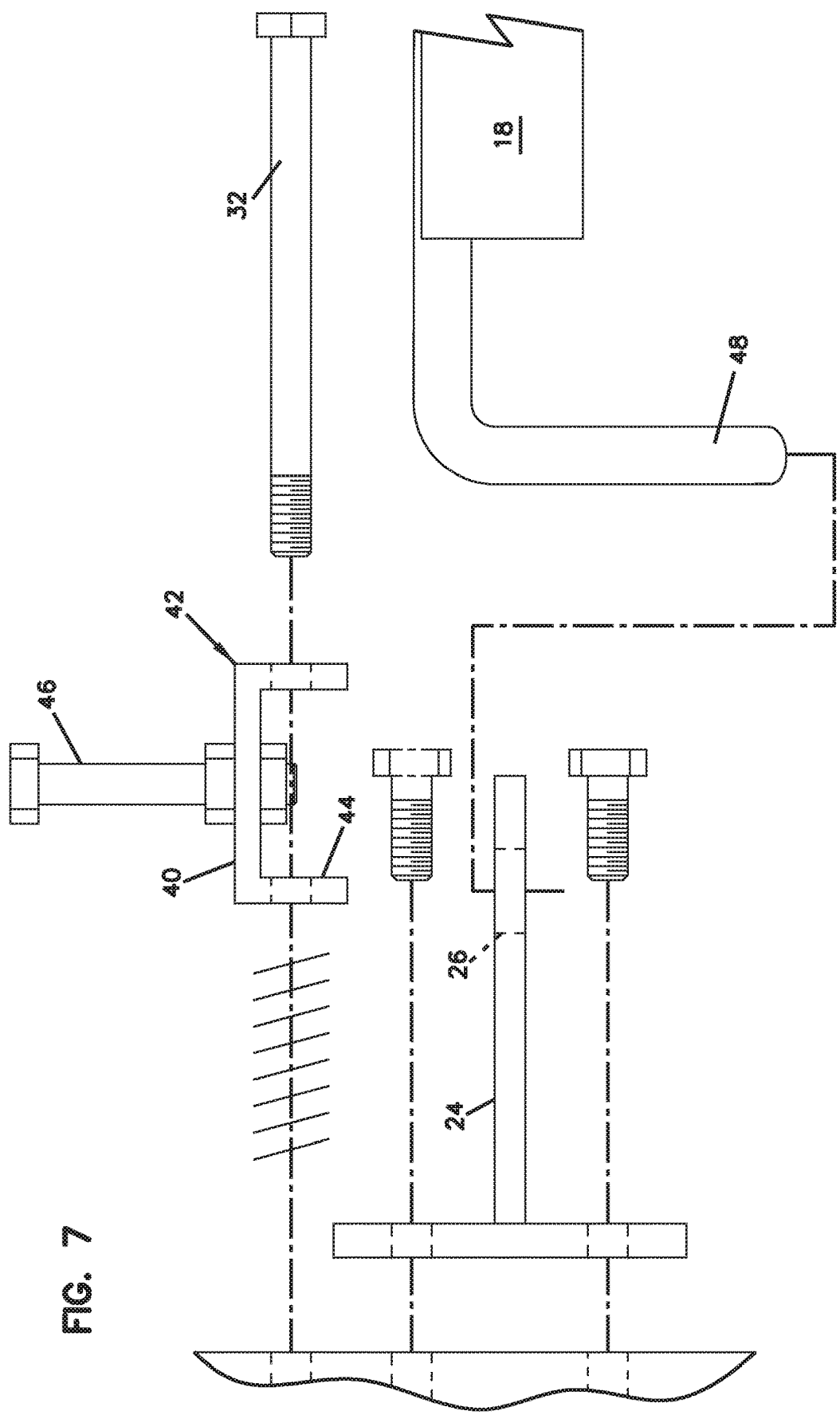
FIG. 7 is an exploded perspective view of the hitch assembly according to an embodiment of the present disclosure.

In the depicted embodiment, the blocking plate 40 is configured such that it is normally biased by the springs in a position that is directly over the aperture 26 in the hitch plate 24 (FIG. 6). The blocking plate 40 is configured such that when the blocking plate 40 is sliding rearwardly it is not vertically aligned with the aperture 26 in the hitch plate 24. This allows for the easy coupling and decoupling of the drawbar from the hitch. As discussed above, there exists many alternative configurations for moving the blocking plate mechanism.

In the depicted embodiment, the drawbar has a downwardly extending boss 48 at its distal end. The downwardly extending boss 48 is configured to be received in the aperture 26 of a hitch assembly 22. The hitch assembly 22 could be part of another cart or mounted to the rear of a tugger 30. The securing mechanism of the present disclosure is not hitch height dependent. For example, the drawbar can be configured to connect to a lower hitch of another cart, as well as a higher hitch of a tugger. In the depicted embodiment, the drawbar itself is free to pivot, as the securing mechanism is part of the hitch rather than the drawbar.

A method of coupling carts is described herein. In the illustrated embodiment, the method involves securing a drawbar to a hitch. In the depicted embodiment, the method includes driving a blocking plate forwardly against the force of a spring; aligning a downwardly extending boss of a drawbar with an aperture in a hitch plate; lowering the boss into the aperture in the hitch plate; and releasing the blocking plate. It should be appreciated that alternative embodiments of the method may include additional steps or fewer steps.

In the depicted embodiment, the step of releasing the blocking plate allows it to spring rearwardly to a position that is directly above the aperture in the hitch plate. The step of driving a blocking plate forwardly includes using one's foot to press against a kick bar that is attached to the kick plate. As discussed above, many alternatives are possible. For example, the blocking plate could instead be manually hand activated.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A hitch assembly comprising:
   a hitch plate that is configured to extend in a rearward direction, the hitch plate including a vertical aperture;
   a drawbar locking assembly positioned above the hitch plate, the drawbar locking assembly including:
   a guide assembly positioned above the hitch plate, wherein the guide assembly includes at least two parallel bars that extend rearwardly;
   a blocking plate configured to slide rearwardly and forwardly along the guide assembly; and
   at least one spring that biases the blocking plate rearwardly.

2. The hitch assembly of claim 1, wherein each of the bars include a coil spring coaxially positioned around each bar.

3. The hitch assembly of claim 1, wherein the blocking plate includes lower extending flanges which the bars extend through.

4. The hitch assembly of claim 1, further comprising a kick bar that extends upwardly from the blocking plate.

5. The hitch assembly of claim 1, wherein the blocking plate is positioned such that it is normally biased in a position that is directly over the aperture in the hitch plate.

6. The hitch assembly of claim 5, wherein the blocking plate is configured such that when it is sliding rearwardly it is no longer vertically aligned with the aperture in the hitch plate.

7. A cart comprising:
   a chassis having a front end and a rear end;
   a plurality of wheels connected to the chassis configured to support the chassis;
   a drawbar mount extending from the front end of the chassis, the drawbar having a downwardly extending boss at its distal end, the drawbar being pivotally connected to the front end of the chassis;
   a hitch connected to the rear end of the chassis, the hitch includes:
   a hitch plate that is configured to extend in a rearward direction, the hitch plate including a vertical aperture;
   a drawbar locking assembly positioned above the hitch plate, the drawbar locking assembly including:
   a plate guide assembly positioned above the hitch plate;
   a blocking plate configured to slide rearwardly and forwardly along the plate guide assembly; and
   at least one spring that biases the blocking plate rearwardly.

8. The cart of claim 7, wherein the guide assembly includes two parallel bars that extend rearwardly.

9. The cart of claim 8, wherein each of the bars include a coil spring coaxially positioned around the bar.

10. The cart of claim 8, wherein the plate includes lower extending flanges which the bars extend through.

11. The cart of claim 7, further comprising a kick bar that extends upwardly from the blocking plate.

12. The cart of claim 7, wherein the blocking plate is positioned such that it is normally biased in a position that is directly over the aperture in the hitch plate.

13. The cart of claim 12, wherein the blocking plate is configured such that when it is sliding rearwardly it is no longer vertically aligned with the aperture in the hitch plate.

* * * * *